(12) United States Patent
Davulcu et al.

(10) Patent No.: US 9,524,464 B2
(45) Date of Patent: Dec. 20, 2016

(54) SYSTEM AND METHOD FOR CONTEXTUAL ANALYSIS

(71) Applicants: Hasan Davulcu, Phoenix, AZ (US);
Mark Woodward, Yogyakarta (ID);
Steven Corman, Chandler, AZ (US);
Jieping Ye, Phoenix, AZ (US)

(72) Inventors: Hasan Davulcu, Phoenix, AZ (US);
Mark Woodward, Yogyakarta (ID);
Steven Corman, Chandler, AZ (US);
Jieping Ye, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 382 days.

(21) Appl. No.: 14/198,212

(22) Filed: Mar. 5, 2014

(65) Prior Publication Data
US 2014/0258197 A1    Sep. 11, 2014

Related U.S. Application Data

(60) Provisional application No. 61/772,638, filed on Mar. 5, 2013.

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |
| *G06N 5/02* | (2006.01) |

(52) U.S. Cl.
CPC ............................. *G06N 5/02* (2013.01)

(58) Field of Classification Search
None
See application file for complete search history.

(56) References Cited

U.S. PATENT DOCUMENTS

| | | | |
|---|---|---|---|
| 7,478,089 B2 | 1/2009 | Henkin et al. | |
| 8,458,105 B2 * | 6/2013 | Nolan | 706/13 |
| 2010/0235314 A1 * | 9/2010 | Nolan | G06F 17/30702 706/52 |
| 2011/0256515 A1 * | 10/2011 | Miller | G09B 9/00 434/219 |
| 2012/0130771 A1 * | 5/2012 | Kannan | G06Q 10/06398 707/738 |
| 2013/0080434 A1 | 3/2013 | Subasic et al. | |

OTHER PUBLICATIONS

Palmer, David D., et al. "Multilingual video and audio news alerting." Demonstration Papers at HLT-NAACL 2004. Association for Computational Linguistics, 2004.*

(Continued)

*Primary Examiner* — Luis Sitiriche
(74) *Attorney, Agent, or Firm* — Snell & Wilmer L.L.P.

(57) ABSTRACT

Computerized contextual analysis systems and methods suitable for monitoring situations, regions, and groups characterized by volatility and uncertainty are provided. Via use of exemplary systems and methods, decision makers, for example politicians, warfighters, and analysts can gain insight into the cultures, attitudes, events, and relationships that may impact their missions.

9 Claims, 14 Drawing Sheets

(56) References Cited

OTHER PUBLICATIONS

Kelly, Robert J., and William J. Cook. "Experience in international travel and aversion to terrorism." Journal of Police and Criminal Psychology 10.1 (1994): 62-76.*

Fang, Yi, et al. "Mining contrastive opinions on political texts using cross-perspective topic model." Proceedings of the fifth ACM international conference on Web search and data mining. ACM, 2012.*

"Closing the Gap: Measuring the Social Identity of Terrorists", Keith Ludwick, Sep. 2008, Thesis Naval Postgraduate School Monterey, California.*

Thuraisingham, Bhavani. "Data mining for counter-terrorism." Data Mining: Next Generation Challenges and Future Directions (2004): 157-183.*

Goertz G. et al., "Two-Level Theories and Fuzzy-Set Analysis", Sociological Methods & Research, vol. 33, Issue 4, pp. 497-538 (2005).

Davulcu H. et al., "Analyzing Sentiment Markers Describing Radical and Counter-Radical Elements in Online News", IEEE International Conference on Social Computing, pp. 335-340 (2010).

Tikves S. et al., "A System for Ranking Organizations using Social Scale Analysis", Social Network Analysis and Mining, vol. 3, Issue 3, pp. 313-328 (May 2012).

Tikves S. et al., "Perspective Analysis for Online Debates", International Conference on Advances in Social Networks Analysis and Mining, pp. 898-905, Aug. 26-29 (2012).

Tikves S. et al., "A System for Ranking Organizations Using Social Scale Analysis", Social Network Analysis and Mining Journal, vol. 3, Issue 3, pp. 313-328 (May 2012).

Van'T Klooster S. A. et al., "Practising the scenario-axes technique", Futures, vol. 38, Issue 1, pp. 15-30 (2006).

Wallace A., "Revitalization Movements," American Anthropologist, vol. 58, Issue 2, pp. 264-281 (1956).

Githens-Mazer J., "The rhetoric and reality: radicalization and political discourse," International Political Science Review, vol. 33, Issue 5, pp. 556-567 (2012).

Githens-Mazer J. et al., "Rethinking the Causal Concept of Islamic Radicalization", Political Concepts: Committee on Concepts and Methods Working Paper Series, vol. 42, pp. 3-32 (2010).

Alsumait L. et al., "On-line LDA: Adaptive Topic Models for Mining Text Streams with Applications to Topic Detection and Tracking," in Eighth IEEE International Conference on Data Mining (ICDM '08), pp. 3-12 (2008).

Liu J.et al., "Large-scale sparse logistic regression," in Proceedings of the 15th ACM SIG KDD international conference on Knowledge Discovery and Data Mining, pp. 547-556 (2009).

Yuan M. et al., "Model selection and estimation in the gaussian graphical model," Biometrika, vol. 94, Issue 1, pp. 19-35 (2007).

Friedman J. et al., "Sparse inverse covariance estimation with the graphical lasso," Biostatistics, vol. 9, Issue 3, pp. 432-441 (2008).

MacCallum R.C. et al., "Applications of structural equation modeling in psychological research", Annual Review of Psychology, vol. 51, Issue 1, pp. 201-226 (2000).

Tibshirani R., "Regression shrinkage and selection via the lasso," Journal of the Royal Statistical Society, Series B, vol. 58, Issue 1, pp. 267-288 (1996).

Goldenberg J. et al., "Talk of the network: A complex systems look at the underlying process of word-of-mouth," Marketing Letters, vol. 12, Issue 3, pp. 211-223 (2001).

Gruhl D. et al., "Information diffusion through blogspace," in Proceedings of the 13th international Conference on World Wide Web (WWW '04), New York, pp. 491-501 (2004).

Berger P. L., "The Sociological Study of Sectarianism," Social Research, vol. 51, Issue 1-2, pp. 367-385 (1984).

Akaike H., "A new look at the statistical model identification," IEEE Transactions on Automatic Control, vol. 19, Issue 6, pp. 716-723 (1974).

Wallace S et al., "Contextual Intelligence & Advanced Analytics for Telecommunications", Heavy Reading, Jun. 2012.

Banerjee N. et al., "Contextual Analysis of User Interests in Social Media Sites—An Exploration with Micro-blogs", IBM Research Report, Computer Science, Aug. 2009.

Ceran B. et al, "A Semantic Triplet Based Story Classifier", 2012 IEEE/ACM International Conference on Advances in Social Networks Analysis and Mining, pp. 573-580 (2012).

* cited by examiner

FIG. 1E

Perspective Mining

| Radical Islamist Perspectives | SHARIA | Counter-Radical-Islamist Perspectives |
|---|---|---|
| Islamic, war, empire, foreign, perverted, controlled, Capitalism | Business | Religious, banking, tradition, growing, develop, modern |
| Quran, Aqidah, destroy, enemy, pagan, sin, evil, faith, Muslim | Family | Religion, context, woman, university, tradition, justice |
| Muhammad, pagan, empire, Christian, enemy, reject, Muslims, woman, government, international | Social | Religion, justice, boarding, religious, God, intend, context, mutual, awareness, tradition, thinker, culture |
| Quran, Muhammad, Prayer, implement, path, empire, follow, Christian, woman, enemy, western, Ahmad, pagan, sin, Jew | Religious | Religion, religious, boarding, community, science, tradition, justice |
| Empire, Muhammad, reject, pagan, change, Capitalism, state | Criminal | Law, Islamic, tradition, nur, seek, science, text, middle, different, universal, studets, discourse, thought, Arab |
| Muslims, enemy, leader, Muhammad, empire, government, enforcement, Mujahedeen, Apostle/Christian, invaders, media, mission, establishment | Jihad | Religion, Indonesia, future, different, understanding, university, boarding, network, growing, history, active, community |
| Muslim, believe, prophet, empire, natural, enemy, western, war, fight, media, Ahmad, action, support, Sunnah, invaders, woman, power, destructive | Kafir | People, context, religion, social, difference, justice, theological, process, text, question, think, humanity, tradition, history, value, community, identity, sharia |
| God, empire, Muhammad, Muslims, International, Western, Aqidah, Pagan, media, evil, leader, government, support, Palestine, enemy, achieve, free, establishment, change, woman, news, corrupt | Politics | Religion, politics, Boarding, intellectual, Interpretation, culture, thought, text, context, mutual, discourse, students, principle, tradition |

FIG. 1H

SYSTEM AND METHOD FOR CONTEXTUAL ANALYSIS

CROSS REFERENCE TO RELATED APPLICATIONS

This application claims priority to, and the benefit of U.S. Provisional Application Ser. No. 61/772,638 entitled "SYSTEM AND METHOD FOR CONTEXTUAL ANALYSIS" and filed Mar. 5, 2013, the contents of which are incorporated herein by reference.

FEDERALLY SPONSORED RESEARCH OR DEVELOPMENT

This invention was made with government support under grant number N00014-09-1-0815 awarded by the Office of Naval Research. The Government has certain rights in the invention.

TECHNICAL FIELD

The present disclosure relates to communications, and in particular to contextual analysis of communications.

BACKGROUND

Historically, there has been a gap between what we think we can understand and what we can actually understand in the complex systems that make up societies. Prior approaches are typically limited to making guesses that either operate at macro levels (social, political, cultural, and behavioral) or micro levels (individual followers, influencers, and groups), but not properly between the macro and micro levels. Complex sociopolitical situations are rife with volatility and uncertainty, yet have significant consequences and implications for national security, scenario planning, and so forth. Accordingly, improved systems, methods, and frameworks for contextual analysis are desirable.

SUMMARY

In an exemplary embodiment, a method for contextual analysis comprises obtaining, via a computer system for contextual analysis, representative communications associated with a sociopolitical concept; assessing, via the computer system for contextual analysis, the representative communications in order to form a contextual assessment; and providing, to a user of the system for contextual analysis, the contextual assessment.

The contents of this summary section are provided only as a simplified introduction to the disclosure, and are not intended to be used to limit the scope of the appended claims.

BRIEF DESCRIPTION OF THE DRAWINGS

With reference to the following description and accompanying drawings:

FIG. 1E illustrates an exemplary response table of radical actors in accordance with an exemplary embodiment;

FIG. 1H illustrates an exemplary perspective mining chart in accordance with an exemplary embodiment;

DETAILED DESCRIPTION

Figure 1A:
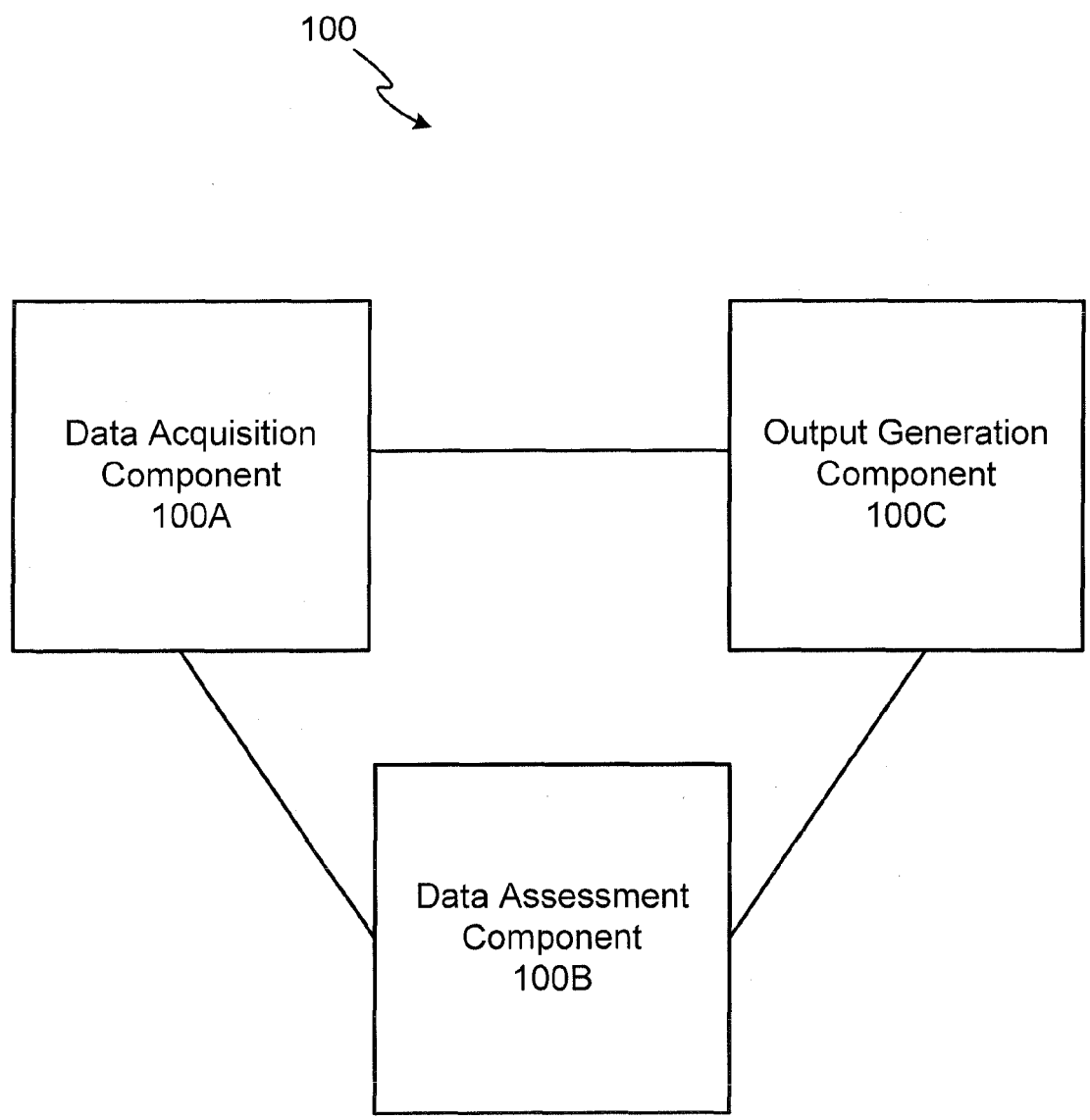
FIG. 1A illustrates a block diagram of an exemplary contextual analysis system in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for scenario planning, document assessment, communications, socio-cultural modeling, and/or the like may not be described in detail herein. Furthermore, the connecting lines shown in various figures contained herein are intended to represent exemplary functional relationships and/or physical or communicative couplings between various elements. It should be noted that many alternative or additional functional relationships may be present in a practical contextual analysis system.

Prior approaches for monitoring social media often amount to little more than tracking frequencies of matching documents for simple, unorganized keyword lists containing names of groups, individuals, practices, brands, places, and so forth. Such approaches offer limited insight. In contrast, principles of the present disclosure contemplate contextual analysis systems and methods configured to assess, show, and/or characterize: the size and geographic footprint of social-media active groups; links and interactions between groups (for example, trans-national groups), their conflicts, and alliances; lists, locations, and other demographic information about a group's followers; geographic trends for groups; key drivers (events and narratives) of group growth, shrinkage, merger, and splintering; and detailed information about the patterns associated with a geographic location, a group, or an individual. In contrast to prior approaches, contextual analysis systems configured in accordance with principles of the present disclosure do not require machine translation for modeling languages, or sentiment analysis for detecting group ideologies. Rather, exemplary contextual analysis systems are capable of performing multi-lingual topic and/or feature detection. For example, Arabic and/or English topics may be detected in a corpus comprising Arabic, English, and/or any other language.

In accordance with principles of the present disclosure, exemplary embodiments contemplate a system for real-time contextual analysis and scenario planning, for example in complex socio-political situations that are rife with volatility and uncertainty—a "looking glass" that enables decision makers, for example political and/or military leaders, to see through the "big text" into cultures, attitudes, events, and relationships that impact their missions. Users of exemplary systems are enabled to understand the driving factors of behaviors in complex and dynamic environments, for example by accounting for beliefs, goals, and intentions of influential state and non-state actors, as well as their leaders and followers.

With reference now to FIG. 1A, in various exemplary embodiments a contextual analysis system 100 comprises a data acquisition component 100A, a data assessment component 100B, and an output generation component 100C. Data acquisition component 100A is configured to acquire data, for example social media postings, web pages, email messages, and/or the like, as inputs for contextual analysis system 100. Data assessment component 100B is configured to operate on input data, for example to identify and/or extract trends, classifications, associations, and/or other patterns or conclusions from the input data. Output generation component 100C is configured to provide information to a user of contextual analysis system 100, for example in the form of reports, dashboards, summaries, visualizations, maps, charts, graphs, and/or the like.

One or more contextual analysis system 100 components may be embodied as a customization of an existing computing system, an add-on product, upgraded software, a stand-alone system (e.g., kiosk), a distributed system, a method, a data processing system, a device for data processing, and/or a computer program product. Accordingly, individual contextual analysis system 100 components may take the form of an entirely software embodiment, an entirely hardware embodiment, or an embodiment combining aspects of both software and hardware. Furthermore, individual contextual analysis system 100 components may take the form of a computer program product on a non-transitory computer-readable storage medium having computer-readable program code means embodied in the storage medium. Any suitable computer-readable storage medium may be utilized, including magnetic storage devices (e.g., hard disks), optical storage devices, (e.g., DVD-ROM, CD-ROM, etc.), electronic storage devices (e.g., flash memory), and/or the like.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), Flash files or modules, FLEX, ActionScript, extensible markup language (XML), dynamic HTML, cascading style sheets (CSS), helper applications, plug-ins, and/or the like.

With reference now to FIGS. 1A through 1H, in various exemplary embodiments, contextual analysis system 100 is configured to utilize various configurable and/or open-source software components. For example, contextual analysis system 100 may utilize a PostgreSQL database in connection with a data acquisition component 100A and/or a data assessment component 100B (e.g., to store input data), Apache Solr in connection with a data acquisition component 100A and/or a data assessment component 100B (e.g., to provide keyword searching, parametric searching, and/or the like), and Javascript and Google Charts in connection with an output generation component 100C (e.g., to provide graphical interface and data visualization capabilities to a user).

In an exemplary embodiment, in contextual analysis system 100, new computational representations, algorithms, and tools enable users, for example warfighters and expert analysts, to work together to achieve unprecedented precision and coverage in their analysis of complex socio-cultural phenomena. Contextual analysis system 100 rapidly and cost-effectively bootstraps system capabilities by providing easy-to-use graphical tools that judiciously tap into area-experts to facilitate real-time contextual modeling of any region and of any country. Contextual analysis system 100 is designed to overcome language barriers and cultural biases while identifying, tagging, and analyzing vast amounts of text within seconds. Contextual analysis system 100 allows users to achieve situational awareness, draw better conclusions, and make better decisions, for example when dealing with violent extremism, nation-state instability, an evolving flash mob, and/or the like.

Historically, there has been a gap between what we think we can understand and what we can actually understand in the complex systems that make up societies. Prior approaches were limited to making guesses that either operate at macro levels (social, political, cultural, and behavioral) or micro levels (individual followers, influencers and groups), but not properly between the macro and micro levels. This gap was once a function of imperfect knowledge—it was extremely difficult, if not impossible, to collect and understand data representing all of these vast ranges of behaviors, attitudes and identities. Now, raw data are no longer scarce; for example, open source material available via social media is abundant. The ability to analyze and make sense of all of that data is a challenge. Contextual analysis system 100 is configured to answer that challenge.

In various exemplary embodiments, contextual analysis system 100 utilizes a mixed-methods socio-cultural modeling methodology. Contextual analysis system 100 is configured in a suitable manner, for example with various web crawlers, scrapers, toolkits, databases, and/or the like, in order to collect, organize, and sort massive amounts of text across social, economic, political and behavioral scales, places and times.

Contextual analysis system 100 utilizes mixed quantitative and qualitative analysis to combine thick-description area studies with "big text" quantitative text analytics, for example to create rich interpretable pictures of complex and dynamic environments. It will be appreciated that such an approach may reorganize beliefs and transform cognitive structures to reveal socio-culturally sensitive options that will more likely lead to desired outcomes in uncertain situations.

In various exemplary embodiments, contextual analysis system 100 is configured with text-analytics capabilities, for example developed through a spiral development process, beginning with a carefully selected scenario that exhibits relevant modeling and analytical challenges. Contextual analysis system 100 may consider any suitable geographic selection. In an exemplary embodiment, contextual analysis system 100 may be utilized to consider broad geographic crescent, for example from the Mediterranean through to the Indian Ocean via Lebanon, Jordan, Syria, Iraq, and Iran. This crescent reflects some of the world's most urgent geo-political issues, placed on a background of the wider issues of sectarianism and national and sub-national identities. These issues include such topics as Kurdish nationalism, resonant and persistent pan-Arabism, state-based nationalism, tribal identities, and/the like.

It will be appreciated that in any use of contextual analysis system 100, individual areas and/or nations may be considered as groups, or independently. For example, Iran is clearly distinct from certain other nations in the region, in part because of its nuclear capacity. Accordingly, contextual analysis system 100 and related methods may be applied to Iran, for example because of the likelihood of and uncertainty in a 3- to 10-year horizon. Internet penetration and media reporting is high throughout this region, providing contextual analysis system 100 with a large source of primary data to collect and analyze.

In an exemplary embodiment, in contextual analysis system 100, the collection, collation and analysis of open source 'big text' streams is simultaneously informed by a series of 'red teaming' workshops to provide an immediate and informed picture of current key developments and trends across a region of interest. Workshop output may be utilized to provide clear and justified metadata templates on which to focus exemplary text analytics methods.

In various exemplary embodiments, contextual analysis system 100 and related methods are configured to provide:

(1) Socio-cultural modeling and contextual understanding using continuous scales. Area knowledge provided by workshop participants may be used for bootstrapping lists of important state and non-state actors (NSA) pertinent to a scenario. Ethnographic field work and discourse analyses are closely related in that both utilize a sophisticated understanding of local history, culture, and the interpretation of religion. One of the fundamental issues with interpretative and qualitative data collection and analysis has been the researchers' bias while conducting the research; in their enthusiasm for reifying complex sociological or political concepts, theorists and empiricists often focus too much on what a concept is, rather than on identifying the concept on a continuum, in order to assess when a concept is present versus when it is absent. In the social sciences, scaling is the process of measuring and ordering actors (subjects) with respect to quantitative attributes or traits (items). Contextual analysis system 100 is configured to support scaling.

In contextual analysis system 100, both state and non-state actors (subjects) and their socio-economic, political, or religious beliefs, goals and practices (items) are mapped simultaneously on a set of scales through expert inputs and algorithms. For each scenario, experts are asked to define a set of relevant social, political, cultural, and behavioral scales, and rank each actor on each scale. For example, with momentary reference to FIG. 1G, in various exemplary embodiments contextual analysis system 100 is configured to utilize a scaling tool whereby a group of actors, for example NSAs, are ranked by experts on a set of scales. In the exemplary embodiment illustrated in FIG. 1G, five NSAs are ranked in a scaling tool. For each scale, one NSA is at the top, one is at the bottom, and the remaining three are distributed therebetween according to the factors associated with that scale.

Suitable algorithms that utilize large amounts of multilingual text collected from a wide variety of relevant actors' media outlets (e.g., web sites, blogs, news, RSS feeds, tweets, leaders' speeches, etc.) may be utilized to discover their hot topics, discriminating perspectives, and specific statistical pattern(s) among their perspectives, for example in order to classify and rank positions on continuous scales at area expert-level accuracy. Stated another way, contextual analysis system 100 can automatically measure, quantify, and represent socio-economic, political, and religious change tendencies of social movements on continuous scales, with accuracy comparable to the most informed human observers.

In certain exemplary embodiments, contextual analysis system 100 achieves accuracy of over 98% in differentiating between radical and counter-radical perspectives (e.g., in determining if a particular message, tweet, blog post, article, etc is associated with a radical viewpoint or a counter-radical viewpoint). Moreover, contextual analysis system 100 may achieve accuracy of over 83% at an organizational level (e.g., in determining if a particular actor, message, tweet, blog post, article, etc is associated with (or communicating like) a particular NSA).

In contextual analysis system 100, keyword phrases based on selected topics, for example on hundreds of hot topics and thousands of topic-specific discriminating perspectives from opposing camps, and the shifting positions of diverse sets of actors may be tracked in real-time on a variety of scales. Using a collection of scales, an analyst utilizing contextual analysis system 100 can determine where along a spectrum any particular group or individual lies, and potentially where it is heading with its rhetoric and activity.

In various exemplary embodiments, contextual analysis system 100 is configured with graphical tools that can be easily used, for example by civilian leaders, warfighters, expert analysts, and the like, to capture and analyze field reports, interviews, and relevant media sources, to create and maintain lists of important state and non-state actors, their leaders, followers, and media channels, and to anticipate the implications of their observed attitudes, beliefs, goals, and practices on a range of social, economic, political and behavioral scales, and places in real time using reliable methods.

In various exemplary embodiments, contextual analysis system 100 is further configured to provide: (2) Analysis of historical text data for identifying opponents' non-traditional tactics, techniques and procedures (TTPs).

Contextual analysis system 100 may utilize any suitable data sources as inputs, for example the Recorded Future API ("Recorded Future"). The Recorded Future API is an ontology and open web source that tracks 75,000+ online sources comprising 1,000+ global newspapers, thousands of blogs, 400+ NGO's, Twitter local unrest coverage, in English, Arabic, Mandarin, Spanish, and Russian languages amounting to a real-time harvest of 300K documents every hour, and comprising 4,000,000,000+ historical and planned future political, economic, terrorism, and disaster events annotated with their dates, places, organizations, quotations, travel and the relationships of people involved. Using Recorded Future event streams as inputs, contextual analysis system 100 is configured with algorithms and easy-to-use graphical tools that enable warfighters and experts to upload their primary experiences and observations in electronic graphical formats; assist them in the discovery of significant events, entities (e.g., people, locations, and organizations), topics, and perspectives buried within text; help them to discover large swaths of distributed online sources as relevant resources; integrate them into standard graphical formats and representations; and visualize their primary data and other resources according to their spatial/temporal dimensions.

Moreover, principles of the present disclosure contemplate analyzing the movements of actors in historical event data to reveal their diachronic trends, full ranges and volatilities of their positions on social, political, spatial, cultural, economic and behavioral scales. Accordingly, contextual analysis system 100 is configured to utilize trend, range and volatility information, and/or other suitable information, for example in order to detect significant shifts and outliers in the data. Contextual analysis system 100 can identify patterns corresponding to periods before, during and after significant shifts, and keep warfighters and experts up-to-date about these patterns. For example, contextual analysis system 100 may utilize a dashboard, highlighting the most relevant news, events and alerts on the driving forces of opponents' behaviors, and critical uncertainties.

Yet further, in various exemplary embodiments, contextual analysis system 100 and related methods are also configured to provide: (3) Text analytics-driven anticipatory scenario development and strategic planning.

History provides only limited guidance in the presence of shocking events and sudden unforeseen major historical shifts, such as the collapse of USSR, the terrorist attacks of September 11, and the Arab Spring protests. Such changes in the environment can create new opportunities, but may also bring about unforeseen risks. Rather than looking for better forecasting techniques, certain prior approaches have utilized scenario planning. Unlike forecasting, scenario planning accepts and tries to understand uncertainty, and makes it part of the reasoning about options, risks and potential outcomes. Scenarios are not predictions or preferences, but rather they are coherent and credible stories, describing different paths that lead to alternate futures.

In various exemplary embodiments, contextual analysis system 100 is configured to utilize a scenario-axes technique. A scenario-axes technique identifies the two most important driving forces, i.e. those developments that are both very uncertain (and therefore can develop into different directions) and could have a decisive impact for the region and the situation. In contextual analysis system 100, a scenario-axes technique is implemented by using a pair of automatically tractable continuous scales to serve as the main scenario axes to align divergent perspectives on how the future may unfold.

In various exemplary embodiments, contextual analysis system 100 and/or related methods employ socio-cultural modeling and contextual understanding using continuous scales. For example, contextual analysis system 100 may leverage social theory including Durkheim's research on collective representations, Simmel's work on conflict and social differentiation, Wallace's writings on revitalization movements, and Tilly and Bayat's studies on contemporary social movement theory, for example to understand features shared by violent social and political movements and by those opposing them.

Radicalism is the ideological conviction that it is acceptable and sometimes obligatory to use violence to effect profound political, cultural and religious transformations and to change the existing social order fundamentally. Radical movements have complex origins and depend on diverse factors that enable the translation of their radical ideology into social, political and religious movements. Accordingly, contextual analysis system 100 is configured to evaluate, rank, categorize, and otherwise assess groups and/or individuals on a radicalism/counter-radicalism scale, a violent/non-violent scale, and/or the like, for example as illustrated in FIG. 1C.

Moreover, contextual analysis system 100 may be utilized to obtain classification and clustering approaches to obtain pure "natural groupings" of religious NSAs, for example in Indonesia and Nigeria. It will be appreciated that clustering may not be fully able to separate all counter-radical or radical organizations into pure clusters. Pure counter-radical clusters may be identified due to their strong reactionary opposition to violent practices through protests and rhetoric. Pure radical clusters may be identified due to their support for violent practices. But the rest of the groupings may be mixed. Accordingly, contextual analysis system 100 considers that binary labeling as "counter-radical" vs. "radical" does not capture the overlaps, movement and interactivity among these actors. Rather, both counter-radical and radical movements, for example in Muslim societies, exhibit distinct combinations of discrete states comprising various social, political, and religious beliefs, goals, attitudes and practices. In contextual analysis system 100, their discriminating perspectives can be semi-automatically identified and mapped onto latent linear continuums or scales.

Figure 1B:
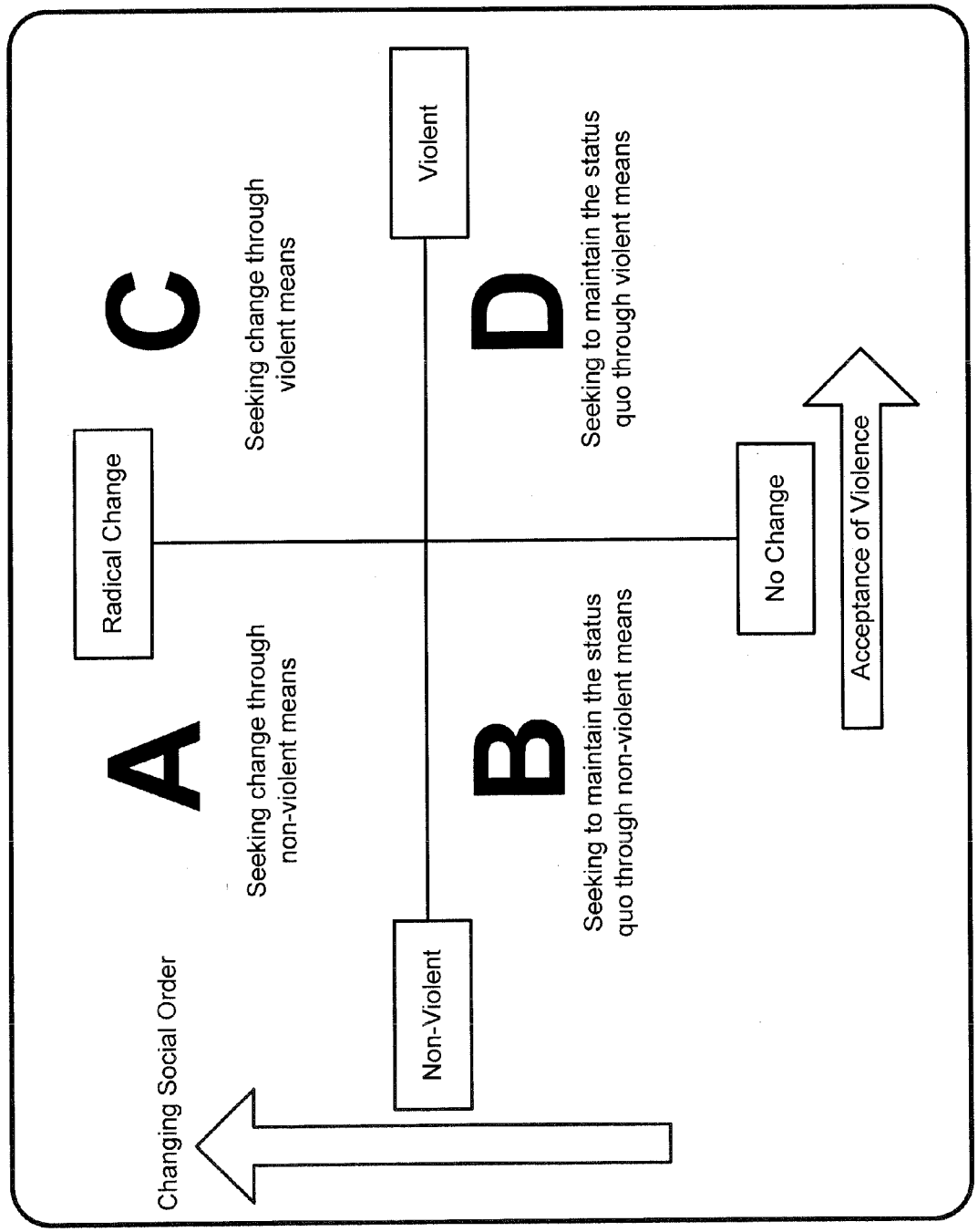
FIG. 1B illustrates an exemplary orthogonal model for contextual analysis in accordance with an exemplary embodiment.
Figure 1C:
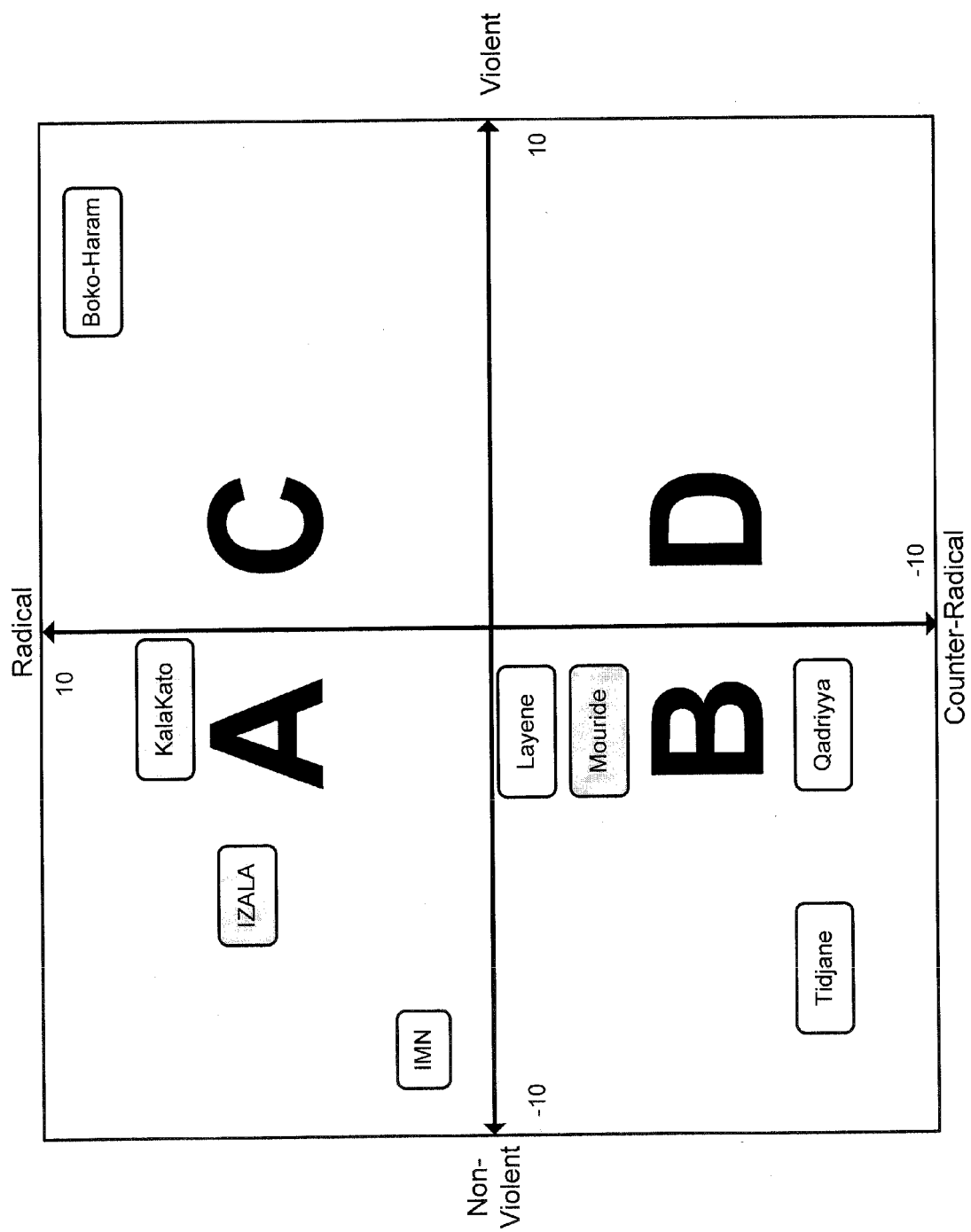
FIG. 1C illustrates an exemplary representation of contextual analysis in accordance with an exemplary embodiment.

With reference now to FIG. 1B, in various exemplary embodiments, contextual analysis system 100 utilizes theoretically based class models comprised of continuous latent scales. In an exemplary embodiment, the first pair of scales focuses on the distinctions between the goals and methods of counter-radical and radical discourse, and captures the degree to which individuals and groups aim to influence the social order (Change Orientation) and the methods and behaviors by which they attempt to do so (Change Strategies). These two scales produce a quadrants model (as illustrated in FIG. 1B) that classifies social trends into analytic quadrants A, B, C, and D, and makes a significant distinction between the violent and non-violent dimensions of both radicalisms and counter radicalisms. Using the quadrants model, a user of contextual analysis system 100 can place organizations, individuals, and/or discourses into broader categories, while still considering the subtle differences between groups within categories. The user also can document movement from category to category, and identify points where movement is likely.

In contextual analysis system 100, a graphical scaling tool provides an intuitive, easy-to-use graphical tool for defining multiple scales, so that users may populate them with polarities and positions of known state and non-state actors. For example, a snapshot of such a graphical scaling tool is shown in FIG. 1C, which maps 8 Nigerian NSAs using the pair of scales described above.

In contextual analysis system 100, tools for the identification and integration of relevant textual material for known NSAs are provided. Moreover, contextual analysis system 100 can integrate automated on-line topic detection in text material. In accordance with principles of the present disclosure, via use of contextual analysis system 100, area-experts can rapidly scan hundreds of topics and accurately associate them with the scales that they defined. For example, a partial list of relevant topics for a Political Change scale for Nigeria include: {sharia, family law, caliphate, Islamic state, corruption, democracy, election, secularism, state, constitution, justice}.

In contextual analysis system 100, discriminating perspective mining may be utilized in debates between the opposing camps on a scale. A debate is a formal discussion on a set of related topics in a forum, in which opposing arguments are put forward. For example, a debate on education might comprise opposing perspectives, such as "secular, multi-cultural education" vs. "religious, sharia-based education". Accordingly, in various exemplary embodiments, contextual analysis system 100 is configured with an automated perspective mining algorithm. The automated perspective mining algorithm contributes to the understanding of features (i.e. social, political, cultural, religious beliefs, goals, and practices) shared by one side of a debate, and by those opposing them.

In various exemplary embodiments, in connection with operation of contextual analysis system 100, a perspective mining problem may be formulated in a general structured spare learning framework. In particular, because this is a dichotomous classification problem, a logistical regression formulation such as the following may be utilized:

$$\min_x \sum_{i=1}^m w_i \log(1 + \exp(-y_i(x^T a_i + c))) + \lambda |x|_1$$

where:

$a_i$ is the vector representation of the $i^{th}$ document;

$w_i$ is the weight assigned to the $i^{th}$ document ($w_i = 1/m$ by default);

$A = [a_1, a_2, \ldots, a_m]$ is a document keyword matrix;

$y_i$ is the polarity of each document based upon the scale polarity of the actor that the document belongs to;

the unknown $x_j$, the j-th element of x, is the weight for each keyword;

$\lambda > 0$ is a regularization parameter that controls the sparsity of the solution; m is the number of documents; $x^T$ is the transpose of x; c is the intercept used in the regression; and $|x|_1 = \Sigma |x_i|$ is 1-norm of the x vector.

Contextual analysis system 100 may utilize a suitable sparse learning package. For example, contextual analysis system 100 may utilize the SLEP sparse learning package developed by Jieping Ye. This sparse learning package utilizes gradient descent approach to solve the foregoing convex and non-smooth optimization problem. In this approach, keyword phrases with non-zero values on the sparse x vector yields the discriminant perspectives based on the polarity (positive or negative).

In various exemplary embodiments, contextual analysis system 100 identifies the keyword characteristics of varying degrees of polarization, from moderate to more extremist positions, on each side of a scale. For example, a Guttman scale presents a number of items, corresponding to socio-cultural, political beliefs, goals and practices, and each actor provides a dichotomous response, e.g. agree/disagree. The Guttman scaling procedure is based on the premise that items can be sorted according to a degree of difficulty. The Guttman pattern appears on the response tables of actors when the actor's perspectives can be sorted from lowest to highest order, according to some degree of difficulty.

Accordingly, in certain exemplary embodiments, contextual analysis system 100 utilizes a sparse inverse covariance estimation to identify a candidate-sorted subset of perspectives that are likely to reveal a Guttman pattern (and hence, are suitable for utilization as reliable markers in Guttman scaling). Graphical lasso or "glasso", a method to estimate a sparse inverse covariance matrix for the features of a given sample set, may also be utilized to obtain an estimate of the inverse covariance matrix in which some elements are exactly equal to zero. By assuming the data are independently distributed, according to Gaussian distribution $N(0;\Sigma)$ where $\Sigma$ is the covariance matrix, a zero in an off-diagonal element of $\Sigma^{-1}$ corresponds to a pair of variables that are conditionally independent given all other variables.

Figure 1D:
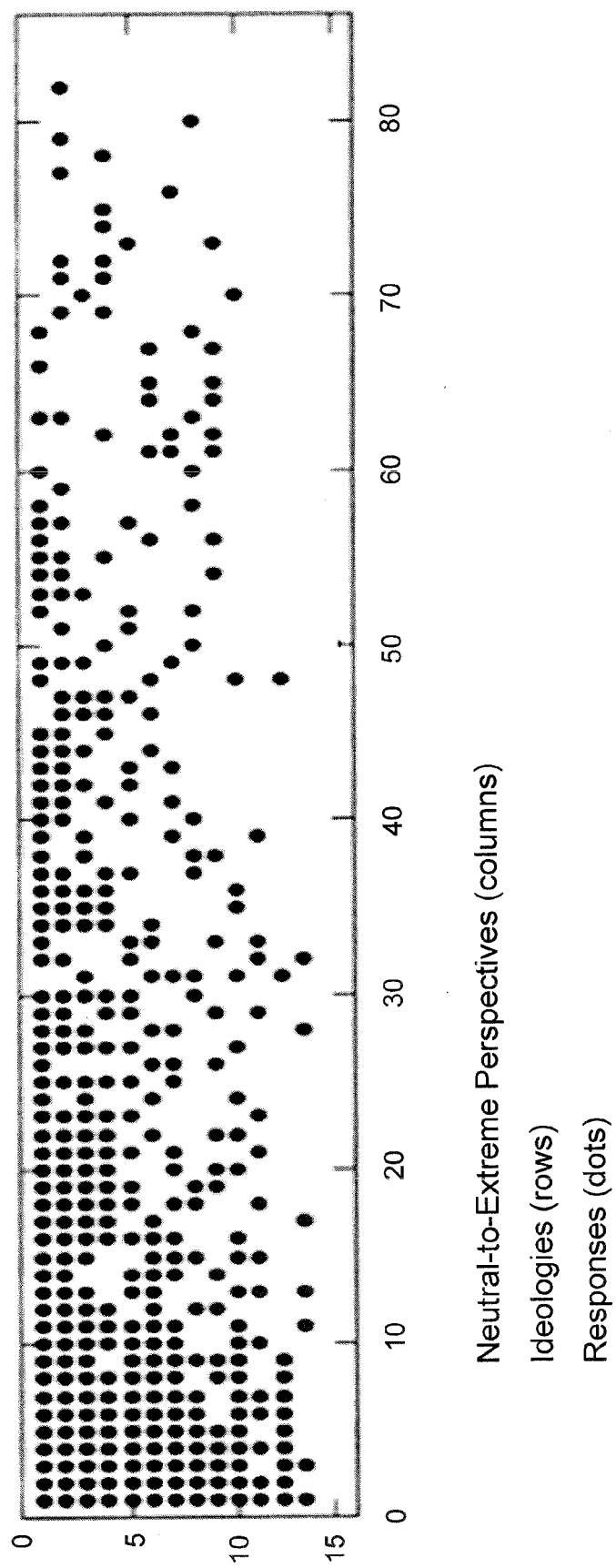
FIG. 1D illustrates an exemplary Guttmann pattern between sorted perspectives, actors, and responses in accordance with an exemplary embodiment.
Figure 1E:
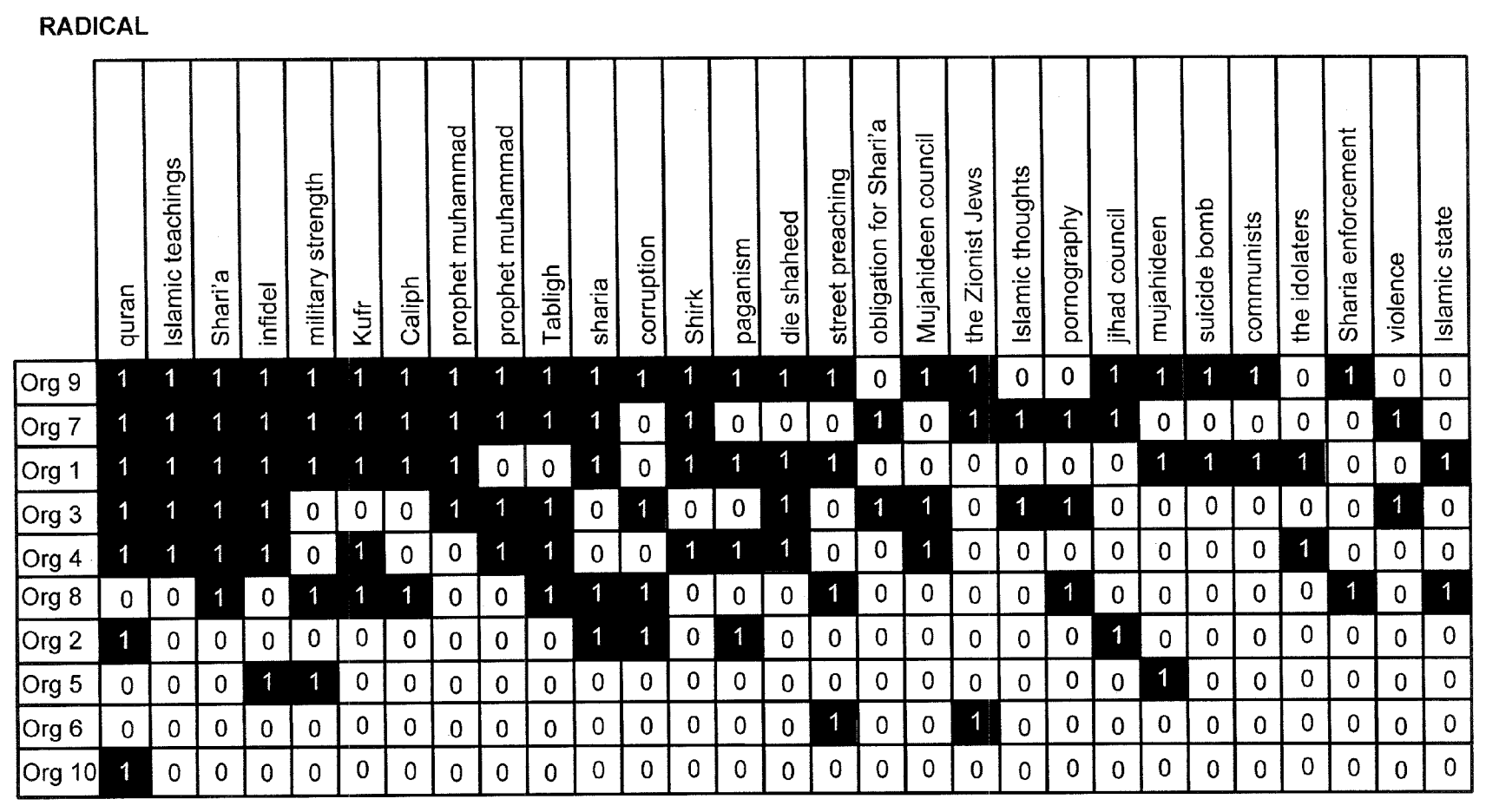
Figure 1F:
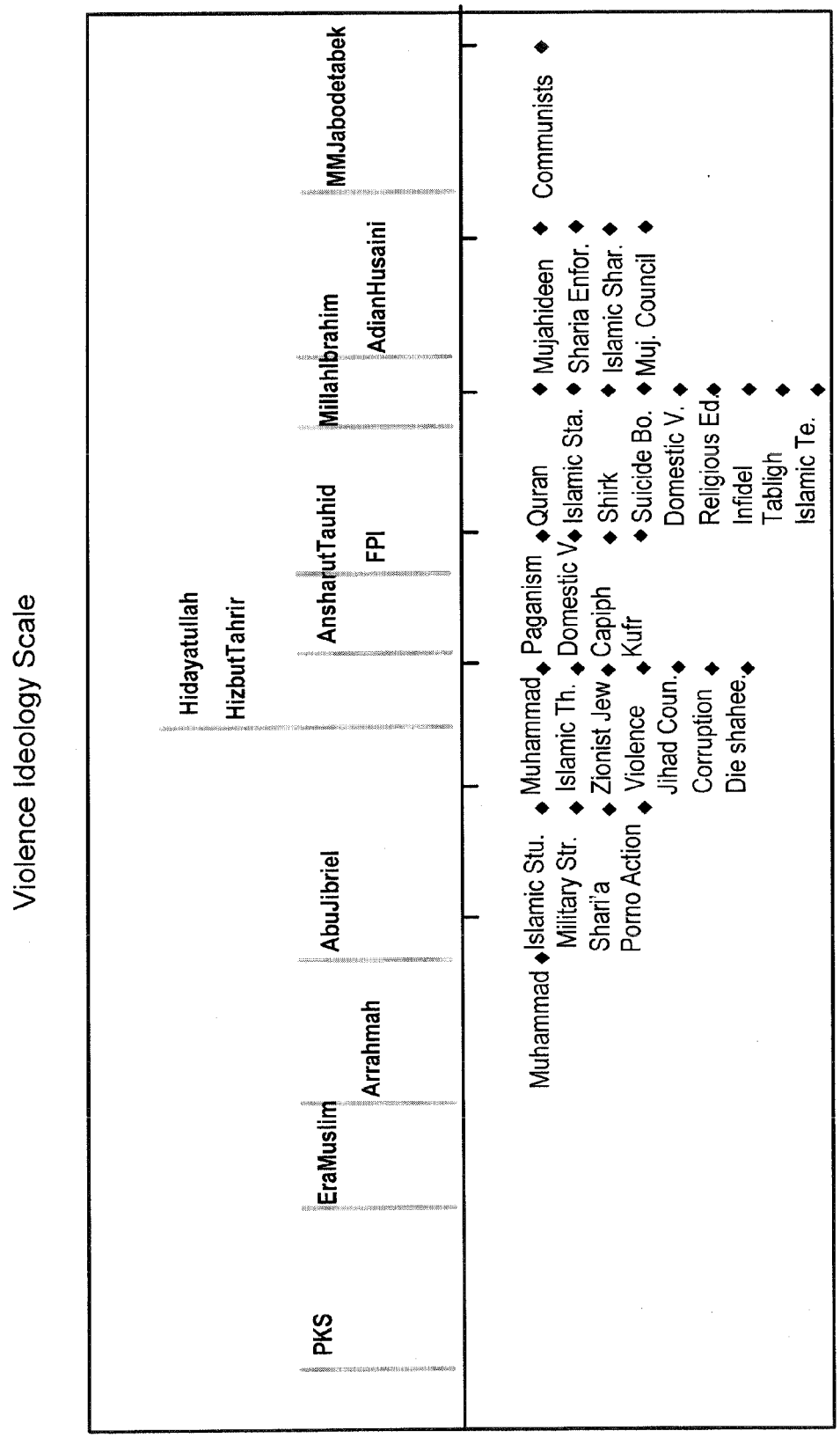
FIG. 1F illustrates an exemplary violence ideology scale for radical actors in accordance with an exemplary embodiment.

With reference now to FIG. 1D, in an exemplary embodiment, contextual analysis system 100 utilizes glasso implementation in the SLEP package to estimate the dependent co-occurrence relationships among all pairs of perspectives. Sorting perspectives in descending order by the numbers of their dependent perspectives generates a candidate set of sorted perspectives for a scale. A sample Guttman pattern arising via operation of contextual analysis system 100 on a particular set of input data is shown in FIG. 1D.

With reference now to FIG. 1E, in contextual analysis system 100, in some exemplary embodiments a response table is calculated, for example based on the normalized frequency with which actors mention various perspectives, as indicated by keywords. The median frequency of each perspective is selected as a threshold. Actors and normalized perspective frequencies are used to build a dichotomous [0/1] response matrix. A sample partial response table for a Violence Ideology scale is presented in FIG. 1E.

It will be appreciated that a true Guttman scale is deterministic, i.e., if an actor subscribes to a certain perspective, then such actor must also agree with all lower order perspectives on the scale. Of course, perfect order is rare in the social world. The Rasch model provides a probabilistic framework for Guttman scales to accommodate incomplete observations and measurement error. Accordingly, in various exemplary embodiments contextual analysis system is configured to utilize the Rasch model to measure the abilities of actors on a latent scale, with the difficulties of perspectives on the same scale.

By definition, the location of an item (difficulty) on a scale corresponds to the actor location (ability) at which there is a 0.5 probability of a response. Once item locations are scaled, then actor locations are measured on the scale using a suitable method, for example using the EM-method for joint Maximum Likelihood Estimation. FIG. 1E illustrates an exemplary radical actor-perspective map associated with operation of contextual analysis system 100. The exemplary map displays the location of discriminating perspective (items) as well as the distribution of actors (subjects) along a Violence Ideology scale developed for an Indonesian scaling study. It will be appreciated that the map in FIG. 1E is shown, as with all other figures in the application, by way of illustration and not of limitation.

Figure 2A:
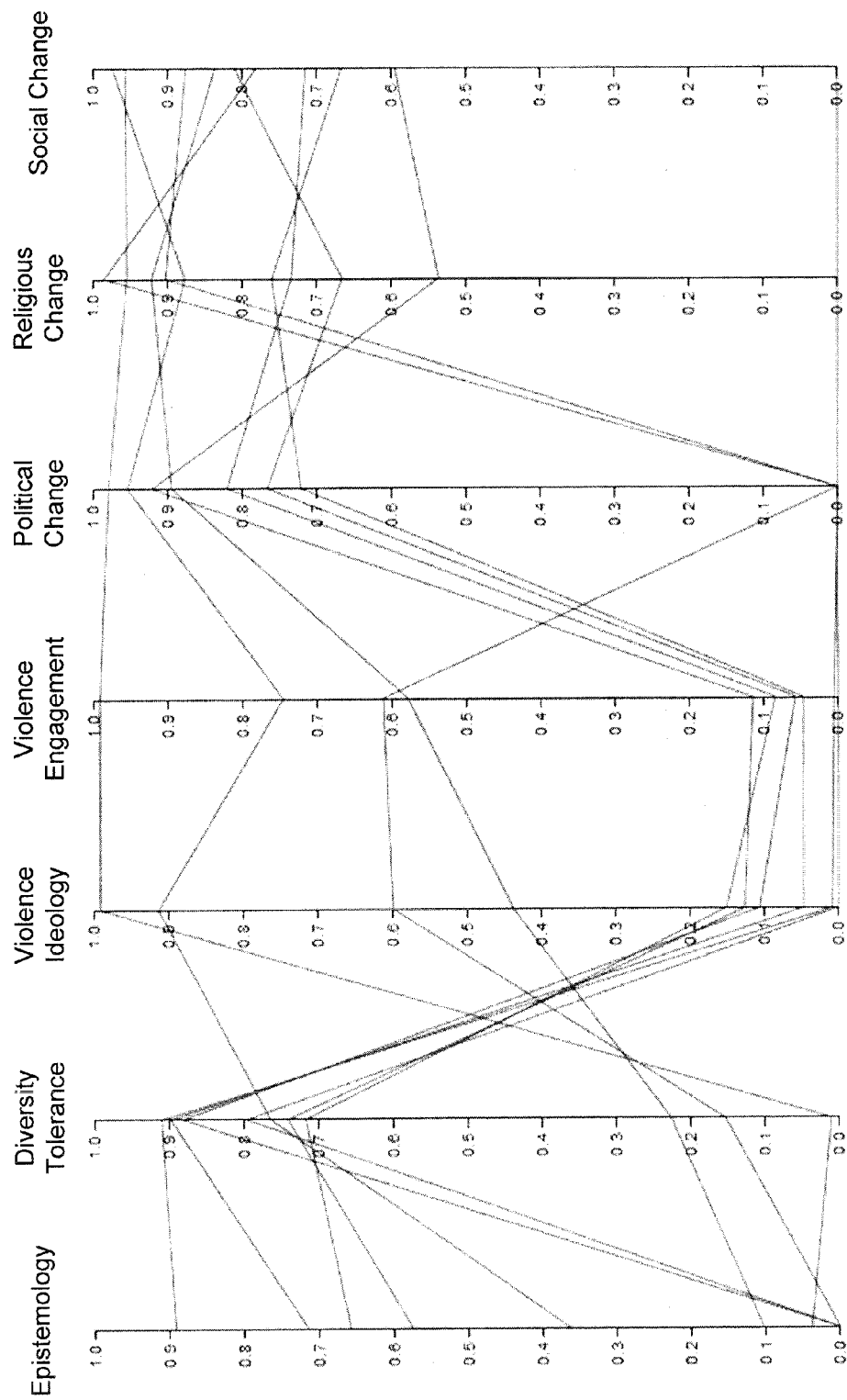
FIG. 2A illustrates exemplary multi-scale comparative analysis of various extremist groups in accordance with an exemplary embodiment.
Figure 2B:
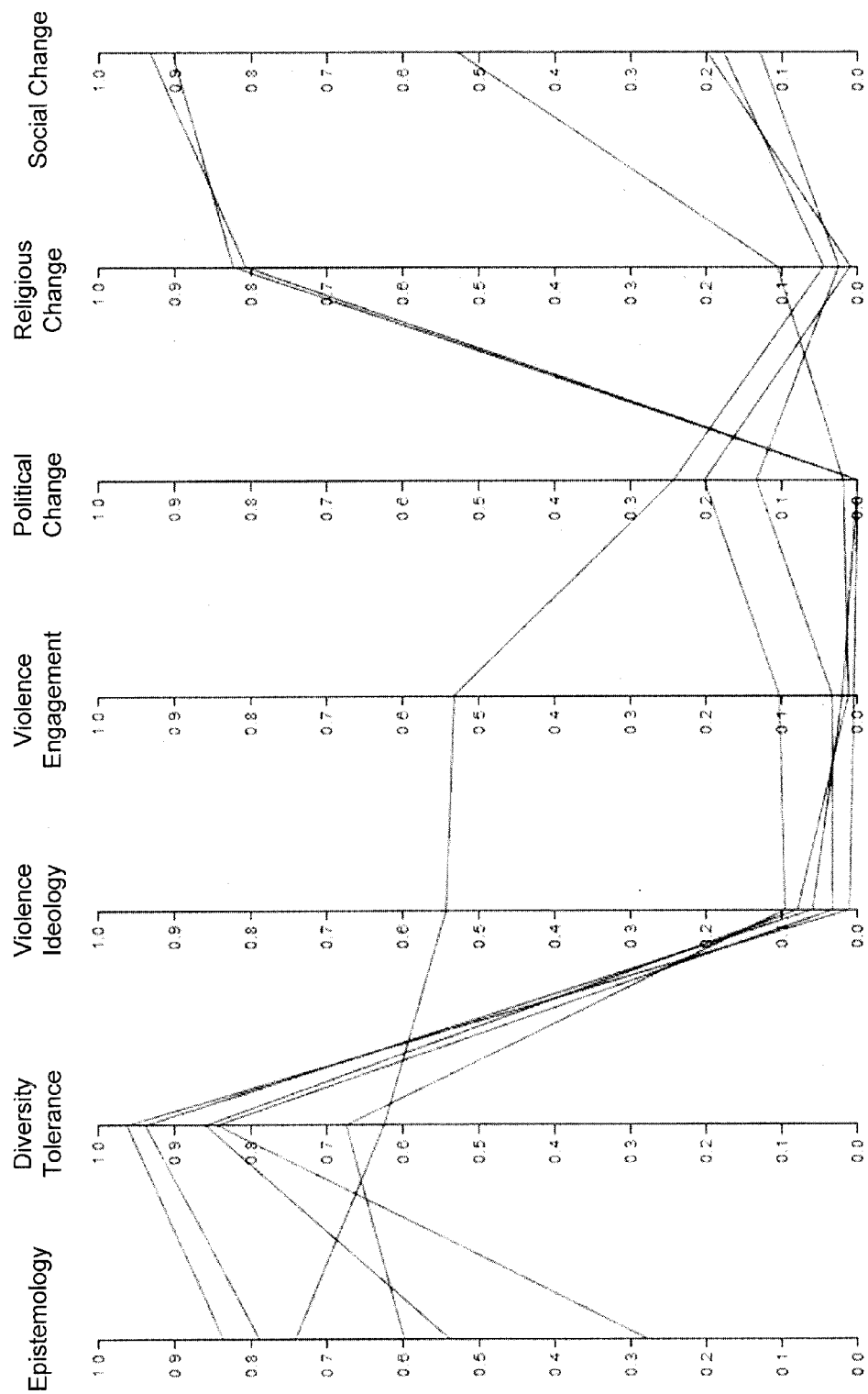
FIG. 2B illustrates exemplary multi-scale comparative analysis of various counter-extremist groups in accordance with an exemplary embodiment.

In addition to the foregoing, contextual analysis system 100 may be configured to utilize analysis of historical text data for identifying opponent's non-traditional tactics, techniques and procedures (TTPs). Multi-dimensional scaling facilitates macro level multivariate and micro level shifts and TTPs analysis. With reference now to FIGS. 2A and 2B, in various exemplary embodiments contextual analysis system 100 is configured to provide parallel coordinates visualization of an actor or group of actors. FIGS. 2A and 2B illustrate a parallel coordinates visualization of ten Nigerian radical (FIG. 2A) and six counter-radical (FIG. 2B) NSAs, on seven continuous scales. In contextual analysis system 100, activity related to macro (social, political, cultural, and behavioral) and micro (individual followers, influencers and groups) levels may be assessed.

In various exemplary embodiments, in a macro level analysis, contextual analysis system 100 may be utilized to understand predictors of violent ideology and/or behavior. To illustrate the effectiveness of various analytical methods for comparative macro level analysis, in accordance with principles of the present disclosure and operation of contextual analysis system 100, data about 27 religious NSAs in Indonesia, 16 NSAs in Nigeria and 24 NSAs in the UK was collected. Area experts independently scaled these organizations on seven exemplary continuous scales: Epistemology, Social Change ambitions, Political Change ambitions, Religious Change ambitions, Diversity Tolerance, Violence Ideology and Violence Engagement.

Contextual analysis system 100 may be utilized to perform exploratory data analysis (EDA) on input data. For example, contextual analysis system 100 may be utilized to check distribution characteristics, identify outliers, compute linear pairwise Pearson correlations, compute scatter plots between scales, and/or the like. Moreover, contextual analysis system 100 system may apply multiple regression analysis using a selected scale or scales, for example only the most relevant scales for the first dependent variable, Violence Ideology. In certain exemplary embodiments, the best multivariate model to predict Violence Ideology was obtained using the AIC (Akaike Information Criterion) for each country's NSAs.

For this exemplary data set, for Indonesia and the United Kingdom, contextual analysis system 100 determined Violence.ideology~Diversity.Tolerance*+Political.change, with a positive slope for Political.change and a negative slope for Diversity.Tolerance, with significant p-values and high R-squared adjusted values of 0.76 and 0.69, respectively. For Nigeria, contextual analysis system 100 determined a slightly different model: Violence.ideology~Diversity.Tolerance**+Social.Change* with R-squared adjusted value of 0.67. Hence, a user of contextual analysis system 100 may determine that a low score on Diversity Tolerance scale combined with a high score in Political Change seems to be the best indicator of Violence Ideology in the UK and Indonesia, where as a low score on Diversity Tolerance combined with a high score in Social Change seems to be the best indicator of Violence Ideology for Nigeria.

It will be appreciated that the foregoing approach has disadvantages. For example, regression analysis does not scale for fitting separate regression equations to different parts of an exemplary model and it does not provide any way to assess the overall model fit. To overcome these limitations, contextual analysis system 100 may utilize path analysis and/or structural equation modeling (SEM). Path analysis and SEM are tools for analyzing multivariate data that are especially appropriate for theory testing. Structural equation models go beyond ordinary regression models to incorporate multiple dependent and independent variables simultaneously, and as such they are well suited for incorporation into contextual analysis system 100.

Figure 2C:
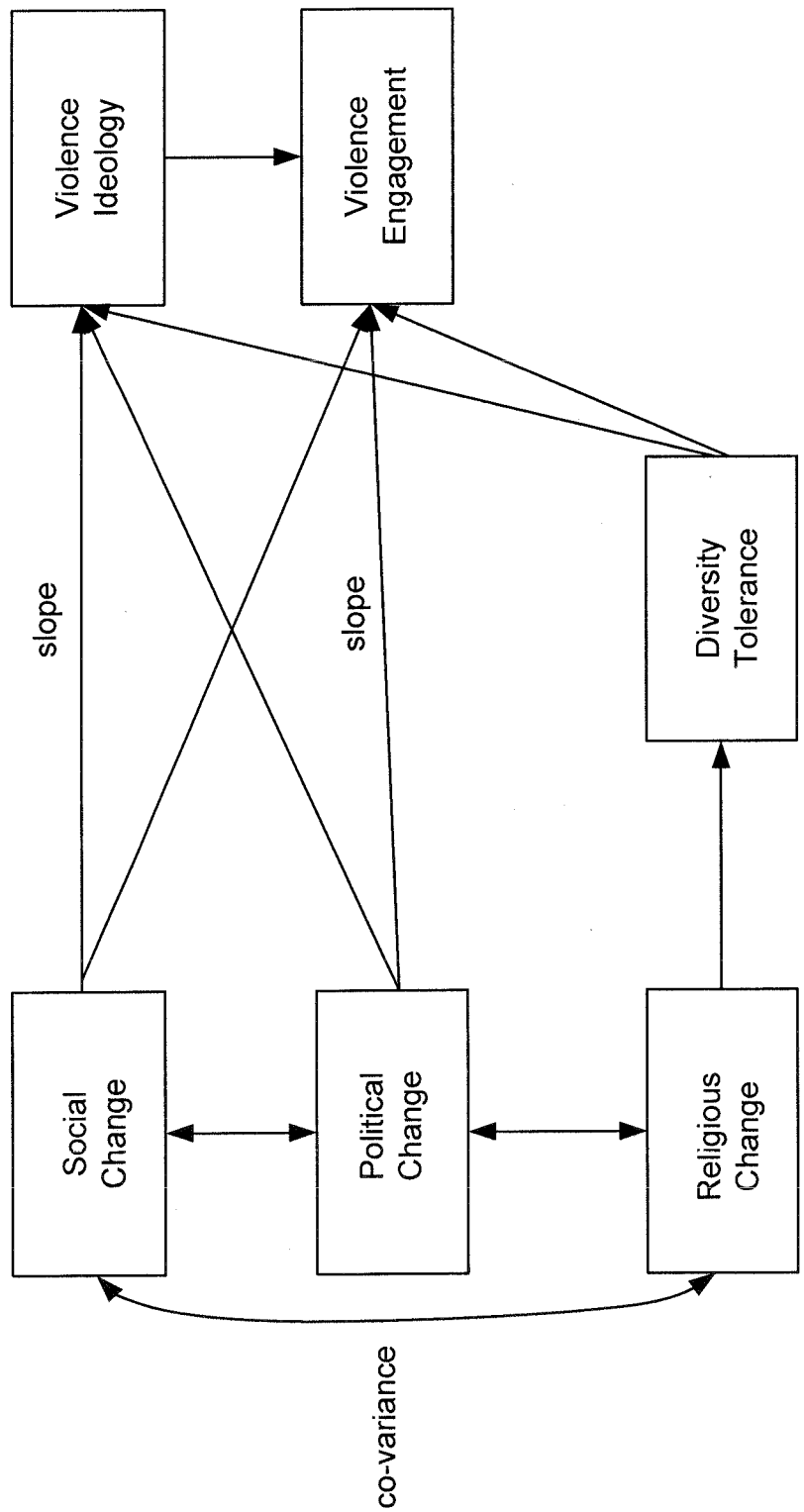
FIG. 2C illustrates a conceptual model for predicting violence ideology and engagement levels in accordance with an exemplary embodiment.

With reference now to FIG. 2C, in various exemplary embodiments, contextual analysis system 100 is configured with easy-to-use graphical tools. In this manner, experts and analysts using contextual analysis system 100 can quickly perform path analysis, and come up with practical conceptual models and estimates for model parameters, and thereafter perform model evaluations and modifications. In one exemplary embodiment, in contextual analysis system 100 an initial graphical conceptual model for predicting Violence Ideology and Engagement variables is illustrated in FIG. 2C. SEM enables rapid evaluation and refinements for this type of macro level conceptual modeling and analysis, and the conceptual model illustrated in FIG. 2C is given by way of illustration and not of limitation.

In contextual analysis system 100, utilization of a logistic regression formulation also provides a classification model. Using the discriminating perspectives, in contextual analysis system 100 a classifier is trained not only to detect if a message or any collection of messages from an individual maps to one polarity or another polarity of a scale (e.g. violent or non-violent), but also if a message or a messenger classifies as a follower of one of the known state or non-state actor's rhetoric or behavioral ideology.

For example, in exemplary 10-fold cross-validation-based experiments, operation of contextual analysis system 100, specifically a logistic formulation-based text message classifier, achieves over 90% accuracy for predicting the corresponding Indonesian, Nigerian or United Kingdom NSA associated with such text message. Combined with longitudinal analysis of an individual's messages (such as those that can be observed on Twitter, message boards, blogs, or in chat rooms), contextual analysis system 100 can determine (i) shifts of individuals from the status of unaffiliated to affiliated of one of the known NSAs, (ii) growth and shrinkage drivers (i.e. types of events and narratives) of NSAs, (iii) influential followers of known NSAs, (iv) information about the absence and presence of factions within an NSA, (v) wedge-driving rumors or perspectives that undermine or strengthen group loyalties, and (vi) web graph and text analysis to detect new, previously unknown NSAs, and their positions on scales. Stated another way, contextual analysis system 100 is capable of automatically mapping tweeters to prevailing radical or counter-radical ideologies, for example radical Islamist or counter-radical Islamist ideology. Moreover, contextual analysis system 100 may be utilized to identify tweeters of interest, breaking news and events, a geographic footprint of polarization, national and/or transnational links between groups, diffusion of radical and/or counter-radical narratives, and/or the like.

Figure 2D:
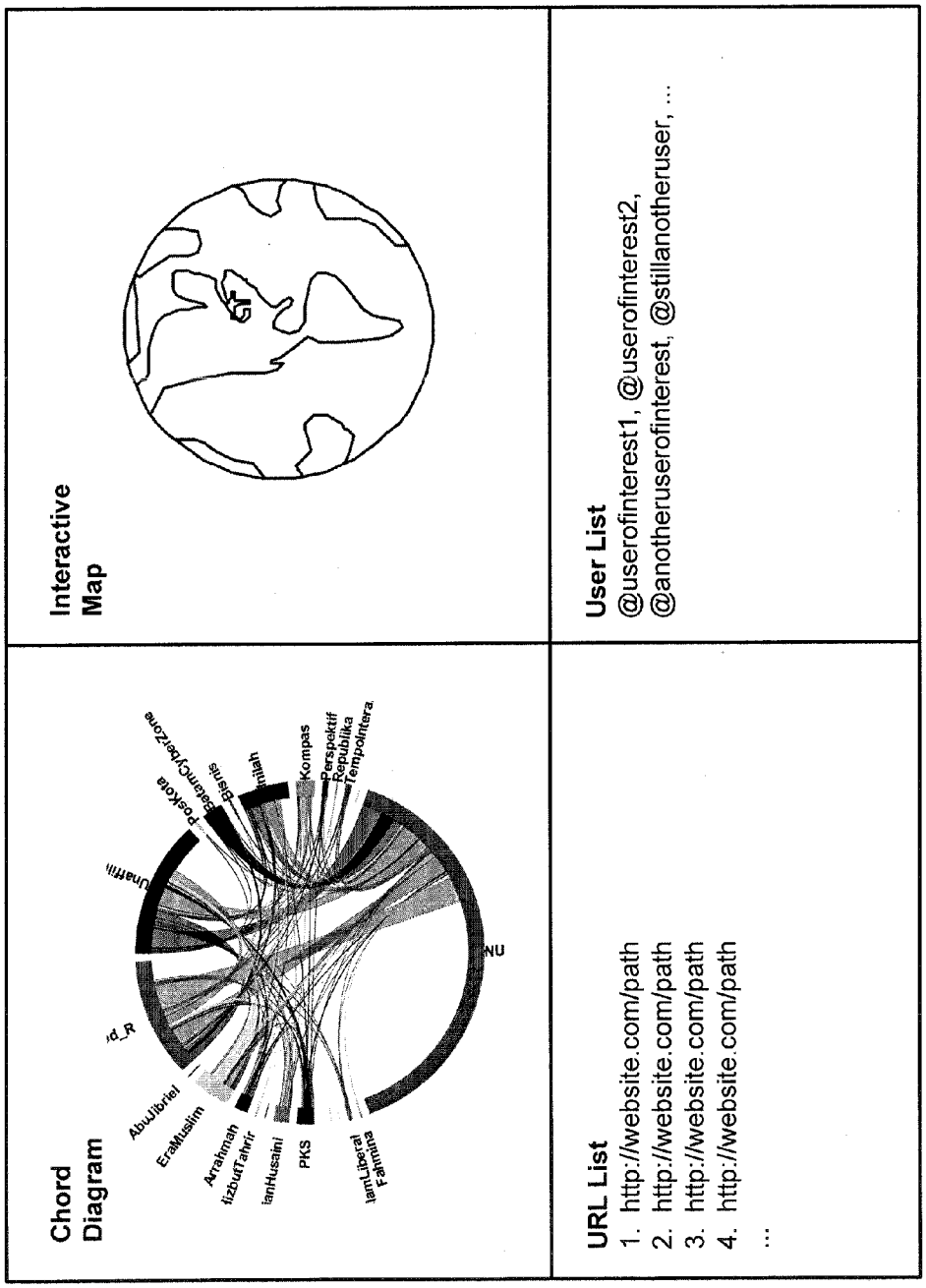
FIG. 2D illustrates a dashboard in an exemplary contextual analysis system.
Figure 2E:
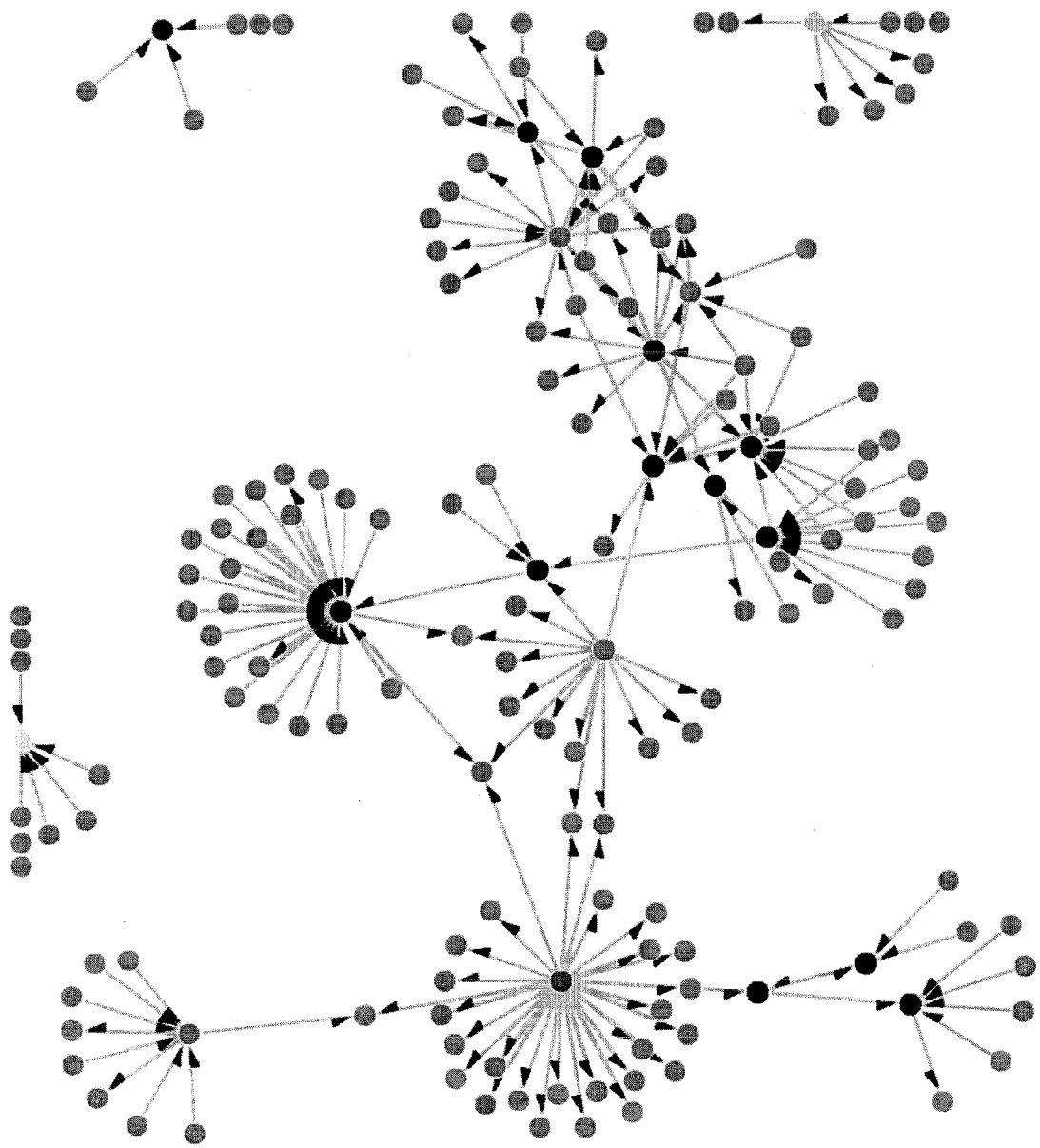
FIG. 2E illustrates a visualization of relationships among individuals generated by an exemplary contextual analysis system.

In various exemplary embodiments, to facilitate user interaction and decision-making, contextual analysis system 100 is configured with an informative real-time dashboard, for example to display types of flows of observable individuals between NSAs, the patterns comprising topics, perspectives, events, influential media sources and the individuals driving these shifts in and out of each NSA, and/or the like. In contextual analysis system 100, the dashboard may incorporate alerts for breaking events (for example, based on hashtags), illustrate online polarization trends, identify geographic footprints, identify influential media sources, illustrate underlying issues, and/or the like, for example as illustrated in FIGS. 2D and 2E.

In various exemplary embodiments, contextual analysis system 100 utilizes a formal model for identifying influential "opinion shifting" messages and individuals based at least in part on the Independent Cascade model of Goldenberg et al. A topic in a text message may be: a phrase; a named entity, such as a location, group or person; an event or a certain perspective(s) on a certain topic(s), and/or the like.

In an exemplary embodiment, in contextual analysis system 100 propagation in this graph model occurs as follows: If a topic exists at vertex U on a given day—i.e., if U has previously written about the topic—then contextual analysis system 100 computes the probability that the topic will propagate from U to a neighboring vertex V. Node V reads the topic from node U on any given day with reading probability $R_{U,V}$, so contextual analysis system 100 chooses a delay from an exponential distribution with parameter $R_{U,V}$. Then, with probability $K_{U,V}$, the author of V chooses to write about it. In one approach, if V reads the topic and chooses not to copy/forward it, then V will never copy that topic from U; there is only a single opportunity for a topic to propagate along any given edge. Alternatively, in another approach, once U is infected, node V will become infected with probability $K_{U,V}R_{U,V}$ on any given day, but once the $R_{U,V}$ coin comes up heads, no further trials are made (i.e., once node V is infected, there is no further need to evaluate if node V is infected).

In certain exemplary embodiments, contextual analysis system 100 is configured to gather a set of inputs, for example, all tweets, blogs, and message board posts that contain a particular topic, into a list $[(u_1, t_1, r_1, o_1), (u_2, t_2, r_2, o_2), \ldots, (u_k, t_k, r_k, o_k)]$ sorted by the publication date, where:

$u_i$ is the universal identifier for blog I;

$t_i$ is the first time at which blog $u_i$ contained a reference to the topic;

$r_i$ is the role, which could, for example, be a tweeter, or follower; and $o_i$ is the opinion orientation on a scale.

In contextual analysis system 100, this list may be referred to as the traversal sequence for the topic. Thus, given the traversal sequence and a graph model depicting different types of edges, such as reader or forwarder edges, contextual analysis system 100 may learn the influence flow arcs and associated probabilities, $K_{U,V}$ and $R_{U,V}$ from a set of opinionated topic traversal sequences.

Prior approaches have utilized an EM-like algorithm to induce these parameters, for example by first computing a "soft assignment" of each new infection to the edges that may have caused it, and then update the edge parameters to increase the likelihood of the assigned infections. However, such prior approaches do not incorporate the roles of messengers and their scaled opinions about the topics.

Accordingly, in contextual analysis system 100, an EM-like algorithm is utilized by incorporating scaled opinions within traversal sequences and computing the influence flow arcs, influential topics/perspectives and associated probabilities for effecting "opinion shift" among tweeters and their followers.

It will be appreciated that most topics do not travel exclusively through social media; rather, they are influenced by real-world events that are covered in the news media. Thus, contextual analysis system 100 extends prior approaches by introducing additional nodes, for example external "news" and "events" nodes. Transmission probabilities and delays are handled, though contextual analysis system 100 may be configured to assume that essentially all tweeters receive input from these types of external nodes, and their influence is computed as well, and combined into "opinion shifting" patterns.

In certain exemplary embodiments, contextual analysis system 100 utilizes text analytics driven anticipatory scenario development and strategic planning. For example, contextual analysis system 100 may utilize a scenario-based spiral development process for developing and testing proposed text analytic capabilities. An example study area may be the broad crescent of geographic territory from the Mediterranean through to the Indian Ocean via Lebanon, Jordan, Syria, Iraq and Iran. Current unrest in Syria is indicative of the contemporary uncertainty in the Middle East. In the wake of the Arab Spring, some regimes have fallen, others have clung on to power, and still others have barely deviated from the status quo ante. The transformation of Iraq, and current uncertain power relations in the Middle East and Persian Gulf, have made predicting specific outcomes more difficult, while simultaneously increasing the relevance of certain kinds of identities—be they sectarian (Sunni/Shia), tribal, or national.

An example is the role of Turkey in the current Syrian situation; this role is complicated by past history, current membership in NATO, and questions of Turkey's warmer relationship with the KRG in Iraq and its problematic relationship with the PKK and specifically the PYD in Syria. These complexities illustrate the intricacies that must be deciphered to begin to understand this case. Traditional approaches to studying these kinds of cases are limited, dependent on a collection of observations, verifiable identity of the informant, and delimited by 'what he or she knows'. Such an approach is inefficient in an era of 'big data' in which collecting a broad range and depth of knowledge is straightforward.

Accordingly, contextual analysis system 100 is configured to combine text analytics with the nuance and complex knowledge that comes from the approaches of traditional qualitative/area studies. In particular, contextual analysis system 100 is configured with tools for utilizing the scenario-axes technique to align divergent perspectives on how the future may unfold.

In accordance with principles of the present disclosure, contextual analysis system 100 may be configured to assess a target location, for example Syria. In an exemplary model, there are two primary axes of uncertainty in Syria. The first is sectarianism, which is defined after Berger as a belief that a specific religious understanding represents and is reality, requires conversion, and that this conversion indicates its universal application, authoritative in its ability to give meaning, that it leads to salvation and community, and that there is a clear sense of historically informed destiny. It will be appreciated that there are two ways to conceptualize the axis of sectarianism in Syria, but only one that will lead to a clear observation of causality. The incorrect way would be to consider an 'Islamic continuum', ranging from Shia at one end of the axis to Sunni on the other. Along such a continuum, more or less observant or doctrinaire positions may be placed; for example, from Maliki or Hanbali to Salafist or Wahabist. The problem with this approach is that, while it might help to explain different forms of mobilization based on religious identity, it tells us little about the actual causal role of religion in explaining uncertainty. Moreover, using this kind of scale may not allow observation of other kinds of trends that may help to explain long-term support for regimes and institutions, such as nationalism, pan-Arabism, tribal identities, etc.

Therefore, in contextual analysis system 100 a scale of sectarianism may be clearly based on the relative presence or absence of sectarianism, without regard to the content of this sectarianism. In other words, the scale should measure the relative presence or absence of the condition (i.e. sectarianism).

A second axis of uncertainty in Syria is more clearly observable and quantifiable, namely, the degree to which there is an integrity and functionality of its state institutions. For purposes of this disclosure, "state" may be defined here as relating to what Giddens, via Weber, has defined as the bordered power container for legitimate violence. In this case, contextual analysis system 100 may be configured to observe the relative presence or absence of the centrifugal (disintegrative) or centripetal (integrative) state of institutions, such as the army, police, interior ministries, foreign ministries, basic infrastructures, economies, and/or the like. Where there is greater centrifugal force, indicating higher degrees of disintegration in the state, combined, for example with higher degrees of sectarianism, via operation of contextual analysis system 100 a user might expect to find more conflict and even violence. In contrast, where there is less divisiveness in sectarianism and higher degrees of state institutional integration and functionality, conditions of relative certainty and stability with relatively low rates of conflict and/or violence may be expected.

In various exemplary embodiments, contextual analysis system 100 is usable to help predict short-term outcomes. For example, in one embodiment contextual analysis system 100 uses qualitatively informed opinions to determine what 'regular' patterns in such data are, and this then provides a baseline moving to determine what looks or feels different from this norm. It will be appreciated that contextual analysis system 100 does not have capacity to predict which decisions are 'correct' to make in light of such changes; rather, contextual analysis system 100 may help inform predictions, for example predictions of what primary, secondary and tertiary effects of kinetic and non-kinetic intervention might look like, should practitioners decide to move in either of these directions.

Via application of principles of the present disclosure, contextual analysis system 100 delivers immediate, intermediate and long-term impacts and represents a leap forward in the application of computer science in the social sciences. Contextual analysis system 100 utilizes a methodological approach and a specific set of tools that facilitate the interaction between big data collection and analysis, and the thick description qualitative informed knowledge of a specific case. Contextual analysis system 100 utilizes these two components in tandem to deliver a tool that provides decision makers and practitioners with the ability to understand specific complex situations, the potential early warning signs of transition in such situations, and also allows them to consider the secondary and tertiary effects of interventions in such cases. Understanding of such complex situations may take many forms, for example from assessing how humanitarian intervention affects the wider social context in a specific case, to assessing what the wider effects of kinetic intervention may be in a non-traditional asymmetric conflict.

In various exemplary embodiments, contextual analysis system 100 is configured to provide insight into situations using a "Looking Glass" approach. For example, the wide arc of potential instability from Tartus to Bandar Abbas has been selected as a likely area of concern in the upcoming 3-year window. With the current partial collapse of the Assad regime, current political unrest in Iraq, and wider instability in the region, this is an area of strategic concern in the intermediate term at the very least. Exemplary potential events that could occur in this timeframe are the collapse of Syria and its implications for Jordan and Lebanon, the disintegration and breakup of the Iraqi State, or the further realization of an Iranian nuclear threat to Gulf and global security. Each of these cases is current, important, and worthy of examination. Accordingly, contextual analysis system 100 may be utilized to assess such situations in order to more fully consider the huge range of contextual factors that are part of effective big data collection and analysis—from social media content to economic factors, from environmental change to the specifics of cultural, tribal, ethnic, national and religious identities.

Figure 1G:
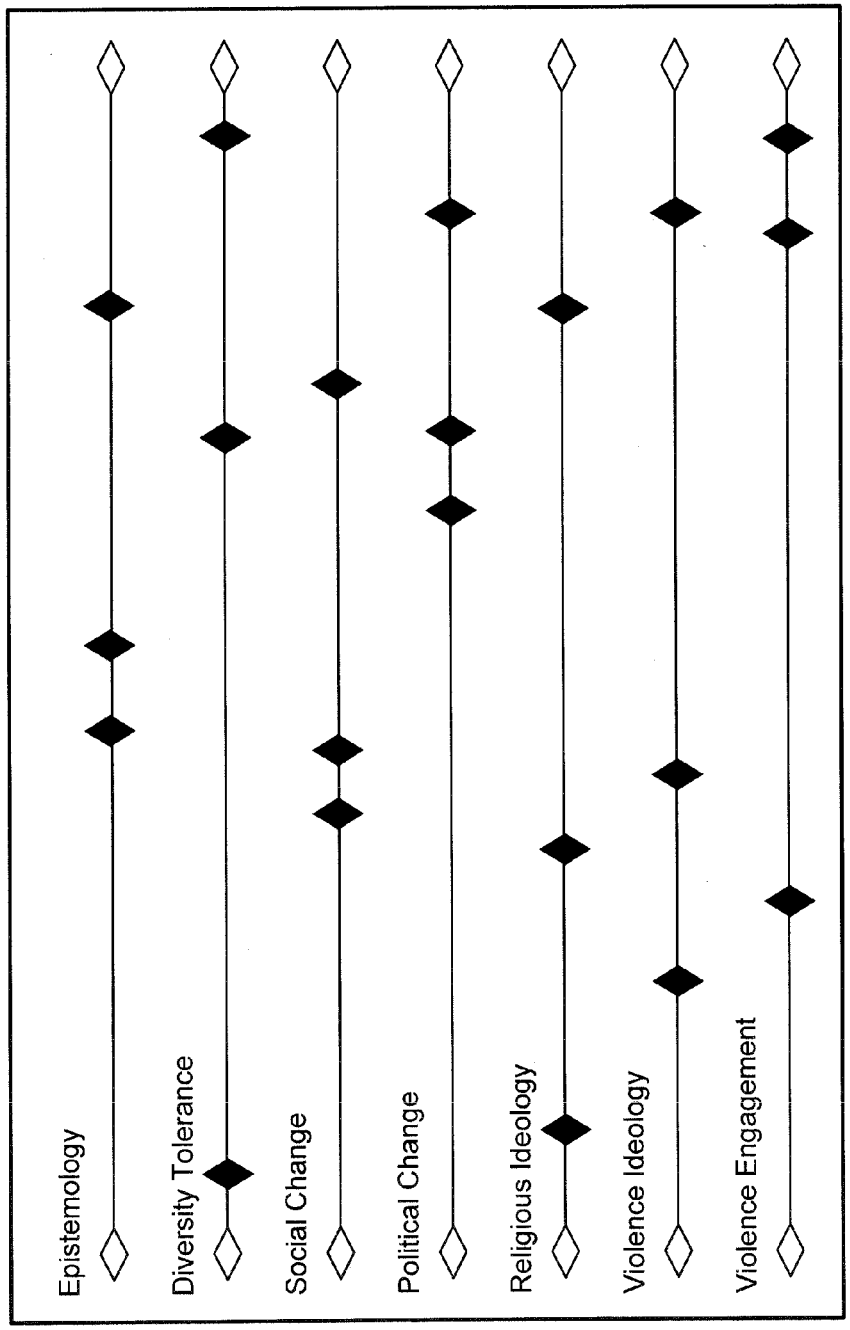
FIG. 1G illustrates an exemplary scaling tool in a contextual analysis system in accordance with an exemplary embodiment.
Figure 3:
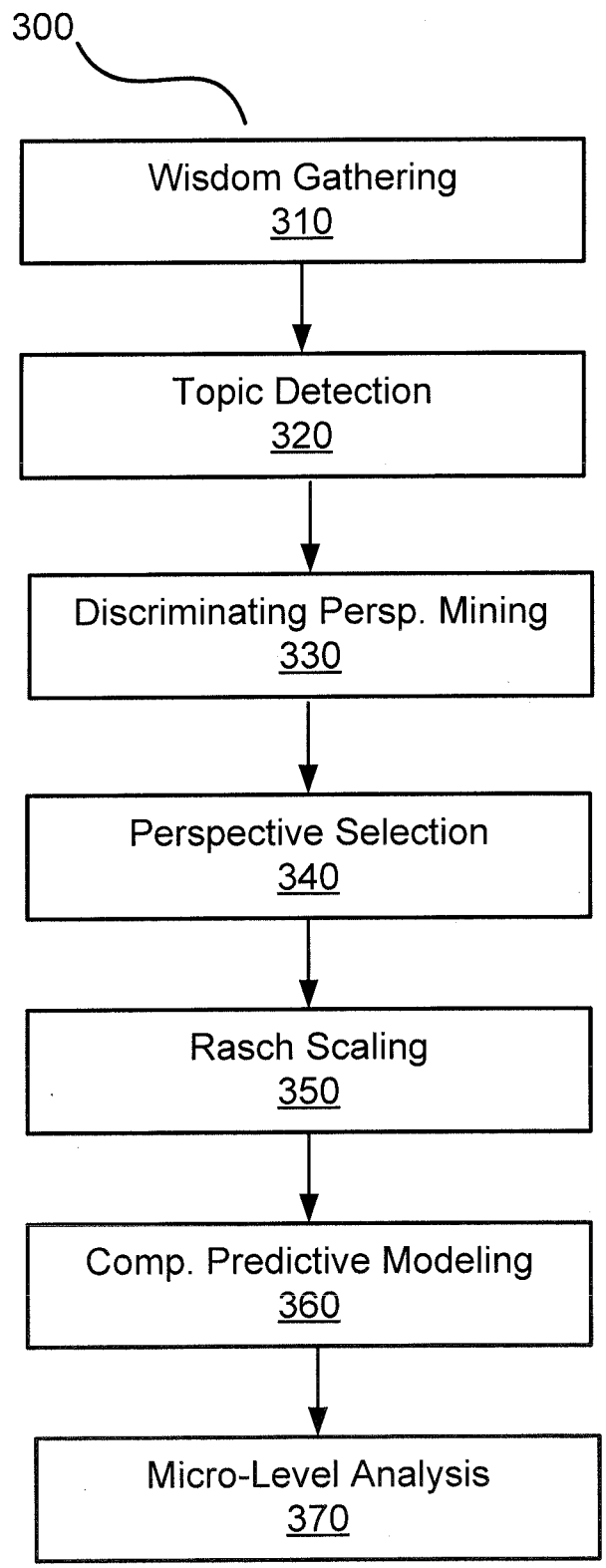
FIG. 3 illustrates an exemplary method for contextual analysis in accordance with an exemplary embodiment.

With reference now to FIG. 3, in various exemplary embodiments, in contextual analysis system 100, a method 300 for contextual analysis comprises utilizing a 7-scale wisdom gathering tool (step 310), utilizing a topic detection and mapping tool (step 320), performing discriminating perspectives mining, for example as illustrated in FIG. 1G (step 330), conducting neutral-to-extreme perspective selection, for example as illustrated in FIG. 1D (step 340), conducting Rasch scaling (step 350), conducting multi-scale comparative predictive modeling, for example as illustrated in FIGS. 2A and 2B (step 360), and conducting micro-level analysis of individuals and/or groups (step 370). It will be appreciated that certain of the steps may be omitted and/or performed in a different order.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

When language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for contextual analysis, comprising:
obtaining, via a computer system configured with a software package for contextual analysis, representative communications associated with a sociopolitical concept;
assessing, via the software package for contextual analysis, the representative communications in order to form a contextual assessment; and
providing, to a user of the software package for contextual analysis, the contextual assessment;
wherein the assessing comprises perspective mining utilizing a logistic regression of the form:

$$\min_{x} \sum_{i=1}^{m} w_i \log(1 + \exp(-y_i(x^T a_i + c))) + \lambda |x|_1$$

wherein in is the number of documents in the representative communications;

$x^T$ is s the transpose of x;

c is the intercept used in the logistic regression;

$a_i$ is the vector representation of the $i^{th}$ document the representative communications;

$w_i$ is the weight assigned to the $i^{th}$ document ($w_i$=1/m by default);

$A=[a_1, a_2, \ldots, a_m]$ is a document keyword matrix;

$y_i$ is the polarity of each document based upon the scale polarity of the actor that the document belongs to;

the unknown $x_1$, the j-th element of x, is the weight for each keyword;

$\lambda > 0$ is a regularization parameter that controls the sparsity of the solution; and $|x|_1 = \Sigma |x_j|$ is 1-norm of the x vector.

2. The method of claim 1, wherein the assessing further comprises at least one of:

multi-scale comparative predictive modeling;
micro-level analysis of individuals or groups;
generating an alert for a breaking event; or
neutral-to-extreme perspective selection.

3. The method of claim 1, wherein the contextual assessment comprises at least one of:

identification of shifts of individuals from unaffiliated to affiliated with a non-state actor (NSA);
growth or shrinkage drivers of the NSA;
identification of an influential follower of the NSA;
information regarding the presence of a faction within the NSA;
identification of wedge-driving rumors or perspectives that undermine or strengthen group loyalties in the NSA; or
identification of a previously unknown NSA.

4. The method of claim 1, wherein the assessing comprises generating a Gutmann pattern arising from the representative communications.

5. The method of claim 1, wherein the assessing utilizes at least one of path analysis or structural equation modeling.

6. The method of claim 1, further comprising utilizing, by the user, the contextual assessment to determine a military response to a non-state actor (NSA).

7. The method of claim 1, further comprising utilizing, by the user, the contextual assessment to determine a political response to a non-state actor (NSA).

8. The method of claim 1, further comprising classifying, via the software package for contextual analysis, at least a subset of the representative communications as being associated with a specific non-state actor (NSA).

9. The method of claim 1, wherein the assessing comprises:

generating a traversal sequence for the representative communications;
forming a graph model associated with messengers of the representative communications; and
determining, via evaluation of the traversal sequence, a likelihood of opinion shift for at least one messenger, wherein the determining utilizes a scaled opinion of the messenger regarding at least one of the representative communications.

\* \* \* \* \*